United States Patent
Kernchen et al.

(10) Patent No.: US 7,158,564 B1
(45) Date of Patent: Jan. 2, 2007

(54) DEVICE FOR GENERATING A DIGITALLY MODULATED TEST SIGNAL

(75) Inventors: Wolfgang Kernchen, Sauerlach (DE); Thomas Braunstorfinger, Munich (DE)

(73) Assignee: Rohde & Schwarz GmbH & Co., Munich (DE)

( * ) Notice: Subject to any disclaimer, the term of this patent is extended or adjusted under 35 U.S.C. 154(b) by 744 days.

(21) Appl. No.: 10/148,061

(22) PCT Filed: Aug. 28, 2000

(86) PCT No.: PCT/EP00/08387

§ 371 (c)(1), (2), (4) Date: May 24, 2002

(87) PCT Pub. No.: WO01/39425

PCT Pub. Date: May 31, 2001

(30) Foreign Application Priority Data

Nov. 26, 1999 (DE) ................. 199 57 093

(51) Int. Cl.
H04B 3/46 (2006.01)
H04B 17/00 (2006.01)
H04Q 1/20 (2006.01)

(52) U.S. Cl. ........................ 375/224
(58) Field of Classification Search ......... 375/224, 375/295, 308, 316, 329; 332/108, 119, 103, 332/151
See application file for complete search history.

(56) References Cited

U.S. PATENT DOCUMENTS

| 5,115,438 | A | * | 5/1992 | Friederichs et al. ........ 714/793 |
| 5,157,693 | A | * | 10/1992 | Lemersal et al. ........... 375/305 |
| 5,438,590 | A | * | 8/1995 | Tzukerman et al. ........ 375/259 |
| 5,588,027 | A | * | 12/1996 | Lim ........................... 375/330 |
| 5,590,155 | A | * | 12/1996 | Yasuda ....................... 375/261 |
| 5,761,216 | A |   | 6/1998 | Sotome et al. |
| 5,812,558 | A |   | 9/1998 | Rotz et al. |
| 5,835,541 | A | * | 11/1998 | Namekata et al. .......... 375/355 |
| 5,894,496 | A | * | 4/1999 | Jones ......................... 455/126 |
| 6,052,404 | A | * | 4/2000 | Tiepermann ................ 375/145 |
| 6,470,055 | B1 | * | 10/2002 | Feher ......................... 375/259 |

(Continued)

FOREIGN PATENT DOCUMENTS

DE 38 40 498 C1 6/1990

(Continued)

OTHER PUBLICATIONS

"GSM-Ausbreitungsmessung mit Signalgenerator SME", Neues von Rohde & Schwarz, Heft 145 (Nov. 1994), pp. 36-37.

(Continued)

Primary Examiner—Mohammed Ghayour
Assistant Examiner—Asian Ettehadieh
(74) Attorney, Agent, or Firm—Lewis, Rice & Fingersh, L.C.

(57) ABSTRACT

The aim of the invention is to generate a digitally modulated test signal, which is generated in the form of a multitude of transmission channels from a digital modulation data stream according to a predetermined digital modulation standard, and which is fed as I and Q values to an I/Q modulator. To this end: a) a portion of the transmission channels is generated, in a modulation coder, directly from an internal or external modulation data stream according to the predetermined modulation standard; b) the I and Q values for at least one portion of the remaining channels are fed as a pre-calculated modulation data sequence of a limited length from a memory to the modulation coder, and; the I and Q values generated according to a) and b) are added and fed to the I/Q modulator.

15 Claims, 1 Drawing Sheet

U.S. PATENT DOCUMENTS 6,483,866 B1 * 11/2002 Suzuki ..................... 375/149
6,587,513 B1 *  7/2003 Ichihara ................... 375/296
6,781,976 B1 *  8/2004 Sonning et al. ............ 370/335

FOREIGN PATENT DOCUMENTS

| DE | 40 20 084 A1 | 1/1992 |
| DE | 42 33 222 C2 | 7/1995 |
| DE | 195 15 037 A1 | 10/1996 |
| DE | 195 17 393 C1 | 10/1996 |
| DE | 198 43 459 A1 | 4/1999 |
| DE | 198 27 028 A1 | 12/1999 |
| DE | 199 55 564 A1 | 5/2000 |
| EP | 0 845 885 A2 | 11/1997 |

OTHER PUBLICATIONS

"Simulation von Kanalrauschen und nichtünearer Verstarkerverzerrung mit Signalgenerator SMIQ" Neues von Rohde & Schwarz, Heft 161 (Jan. 1999) pp. 34-35.

"Testsignalerzeugung fur Digital Audio Broadcasting mit den Generatoren SMHU 58 und ADS" BILD 2 Prinzip eines DAB-Senders., pp. 24-25.

* cited by examiner

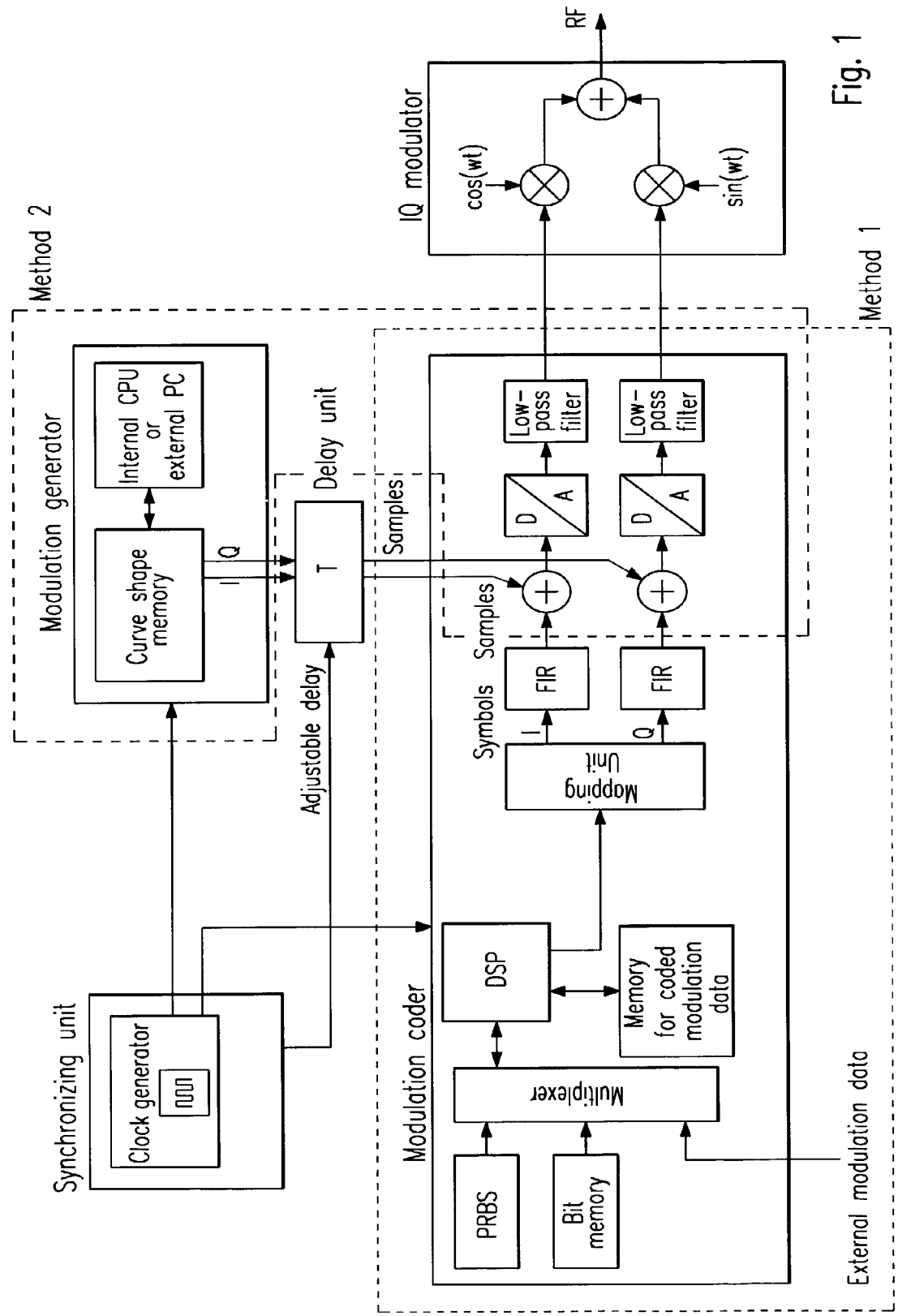

DEVICE FOR GENERATING A DIGITALLY MODULATED TEST SIGNAL

BACKGROUND

1. Field of the Invention

The invention is based on and relates to an arrangement for generating a digitally modulated test signal that is generated in the form of a large number of transmission channels from a digital modulation data flow according to a predetermined digital modulation standard and is fed as I and Q values to an I/Q modulator.

2. Description of the Related Art

Digitally modulated high-frequency or baseband test signals, which are generated in signal generators, are often required for measurement purposes. An enormously wide variety of digital modulation processes have now come into use and depending on these and the measurement tasks, signal generators of this kind operate by one of the following methods of signal processing.

In the first method, a modulation data stream generated internally or externally in a data source is converted into I and Q values by coding and mapping (set of rules which assigns I and Q values to each modulation symbol as a function of the particular complex type of modulation) in a modulation coder and is then fed to the downstream IQ modulator, whose output signal is then converted to the desired high frequency (the Rohde & Schwarz company's SMIQ vector signal generator, data sheet PD757.4582 and extract from associated manual 1084.80004.03, pages 2.78 to 2.112). The internal data source used may for example be a memory from which the data is read out. It is also known for any desired complex data sequences to be assembled from stored data by means of a signal processor, an example of such data sequences being so-called TDMA signals such as are used for global mobile telephone systems (see the various digital modulation standards which are possible, as listed on p. 8 of the data sheet for the SMIQ signal generator). The data sequences that are assembled internally or externally in this way can be processed directly in real time. They may however also be buffer-stored in a memory and only then fed to the IQ modulator.

A second method of signal processing comprises calculating the I and Q values and storing the sequence of I/Q values that has been calculated in this way in w memory for I and Q and then reading the digital IQ values out from this memory, converting them into analog signals and then feeding them directly, in filtered form, to the IQ modulator (a two-channel ARB generator, e.g. the Rohde & Schwarz company's AMIQ modulation generator, data sheet PD757.3970.12 and associated unit specification 1110.3339.11, pages 4.1 to 4.14). This second method is suited above all to modulation standards where a large number of individual transmission channels are generated simultaneously, as has now become standard practice on many modern-day mobile telephone networks. Under the so-called CDMA standard, 64 transmission channels are for example generated simultaneously by means of a so-called Walsh code (as described in, for example, "North American Cellular CDMA", Hewlett-Packard Journal, December 1999, pages 90 to 97), while under the up-to-date W-CDMA method (see description in the AMIQ data sheet, page 9) there are even up to 512 individual transmission channels generated, which are modulated simultaneously onto one or more carriers. This second method does however have the disadvantage that it is not possible to operate in real time, i.e. pre-calculated signals have to be used and external data supplied by the user cannot be made use of. The pre-calculated items of data have to be stored in a memory at a limited length and can therefore only be assembled into a data sequence of any length by being repeated a multiplicity of times in succession. There are therefore limits to how far measurements where the content of the data is crucial can be made, such measurements being required for example for so-called BER (bit error rate) measurement (see the AMIQ data sheet, page 5). For synchronization with data on higher layers (under the ISO layer model) as well or for decoding tests, it is necessary for a lengthy data sequence to have the correct data content or for data made available from outside to be processed in real time.

Hence, although signal generators that operate by the second method do generate complex signals with the correct spectrum and the correct signal statistics, there is, because of the limited storage length, a limit to how far measurements where the correct content of the data is crucial can be made.

Signal generators that operate by the first method on the other hand are, it is true, suitable for making measurements where the correct content of the data is crucial, but they cannot be used for modulation standards under which a large number of transmission channels are used, because the cost and complication required for this purpose would be unacceptable and the performance of normal computers would not be good enough for it. Signal generators that operate by the first method are therefore so far being used only for measuring a few, e.g. four, channels (e.g. for BER measurements, synchronization with data on higher layers, decoding tests) and the remaining channels, such as the remaining 508 channels in the case of W-CDMA for example, are left unused. Such measurements are thus not a true reflection of reality because the neighboring channels too have an effect on the measured result. Nor does adding noise as a substitute for the neighboring channels give a true reflection of reality because noise does not give the orthogonality between the channels that is required under the standard and hence affects the reception characteristics and the measured results are thus falsified.

Hence, although measurements on receivers can be made in real time with signal generators that operate by the first method, the conditions are not a true reflection of reality because only some of the channels are busy and the remaining channels are missing.

SUMMARY

It is therefore an object of the invention to provide an arrangement for generating a digitally modulated test signal that is generated according to one of the usual digital modulation standards employing a large number of transmission channels but that can nevertheless be used to make measurements where the correct content of the data is critical.

This object is achieved on the basis of an arrangement as detailed in the preamble of the main claim by virtue of the characterizing features of the claim. Advantageous refinements can be seen from the subclaims.

BRIEF DESCRIPTION OF THE DRAWINGS

The FIGURE shows a block diagram of an arrangement comprising a modulation coder that operates by the first method described above and a modulation coder that operates by the second method described above.

DESCRIPTION OF PREFERRED EMBODIMENT(S)

An arrangement according to the invention combines within it the advantages of both the known methods mentioned above. For measurement tasks where the correct data content is crucial (BER measurements, synchronization with data on higher layers, decoding tests and the like), it is true that only a proportion of the total number of transmission channels available is used, but realistic data is also applied to the neighboring channels, though it is only calculated data that is read out of a memory in which the storage length is limited, this though being sufficient to produce a test signal that overall is a true reflection of reality. Unfalsified measured results are obtained in this way. The signals that are generated by the two different methods are added synchronously and with the correct temporal correlation with one another, i.e. the clock signal with which the IQ values that are generated by the first method, preferably in real time, are fed to the IQ modulator is selected to be equal to the clock signal with which the IQ values obtained by calculation by the second method are read out of the memory. This ensures that the orthogonality that is required between the individual channels is preserved without being adversely affected.

The data sequence for the actual measurement channels in the first method can be fed in a known manner directly from an internal or external data source, and in the simplest case what is used as an internal data source may for example once again be a memory, that is loaded with the pre-calculated modulation data sequence. From the data that is read out, the I/Q signal proper is then generated in a known manner by coding and mapping in the modulation coder and is fed to the IQ modulator. The modulation data sequence in the first method may also be assembled in a known manner by means of a suitable signal processor from individual components that are either stored in a memory or calculated in real time. In this way it is possible for a measurement to be made in real time even on the basis of internal data. If the data for the first method is stored internally in a memory, different respective cycle lengths, in the form of prime numbers for example, may be selected for this memory and the second memory used for the method. This gives a considerably longer overall cycle (the least common multiple of the individual characteristics) and hence even more realistic signals, i.e. the test signal is not repeated so frequently and is thus an even truer reflection of reality.

The invention will be explained in detail below by reference to a diagrammatic drawing and an embodiment.

The FIGURE shows a block circuit diagram of an arrangement according to the invention, comprising a modulation coder that operates by the first method described above and a modulation coder that operates by the second method described above. The modulation coder is for example similar in construction to the Rohde & Schwartz company's SMIQ vector signal generator and the modulation generator plus its internal memory is also of known design. The IQ values from the modulation generator, which are obtained by calculation, are fed via a delay unit to the adding stages of the modulation coder and the IQ values from the modulation coder are thus added to the IQ values from the modulation generator with the correct temporal correlation between them and are then converted into analog form and are finally fed to the IQ modulator proper, in which they are modulated onto the carrier signal proper. The memories of the modulation generator and the modulation coder are driven by a common clock generator and the IQ values are thus read out synchronously to a clock signal.

The invention claimed is:

1. A method for generating a digitally modulated test signal comprising:
   generating a first group of transmission channels comprising I and Q values, in a modulation coder, directly from a modulation data stream according to a predetermined standard;
   generating a second group of transmission channels comprising I and Q values by repeating a pre-calculated data sequence of limited length, said pre-calculated data sequence being recalled from a memory of a modulation coder;
   adding said I and Q values of said first group and said second group; and
   feeding the result to an I/Q modulator to generate said test signal.

2. The method of claim 1 wherein said adding of said first group and said second group takes places synchronously with a clock signal and with the correct temporal correlation between the I and Q values.

3. The method of claim 2 wherein the I and Q values of the first group are buffer-stored in a memory having a different storage length from a memory that receives the I and Q values of the second group.

4. The method of claim 3 wherein the I and Q values of the first group are generated in real time directly for said modulation data stream.

5. The method of claim 4 wherein said modulation data stream is an internal modulation data stream.

6. The method of claim 4 wherein said modulation data stream is an external modulation data stream.

7. The method of claim 1 wherein the I and Q values of the first group are buffer-stored in a memory having a different storage length from a memory that receives the I and Q values of the second group.

8. The method of claim 7 wherein the I and Q values of the first group are generated in real time directly for said modulation data stream.

9. The method of claim 8 wherein said modulation data stream is an internal modulation data stream.

10. The method of claim 8 wherein said modulation data stream is an external modulation data stream.

11. The method of claim 1 wherein the I and Q values of the first group are generated in real time directly for said modulation data stream.

12. The method of claim 11 wherein said modulation data stream is an internal modulation data stream.

13. The method of claim 11 wherein said modulation data stream is an external modulation data stream.

14. The method of claim 1 wherein said modulation data stream is an internal modulation data stream.

15. The method of claim 1 wherein said modulation data stream is an external modulation data stream.

* * * * *